(No Model.)
T. F. HARRISON, Jr.
WATER BUCKET STAND.
No. 245,295. Patented Aug. 9, 1881.
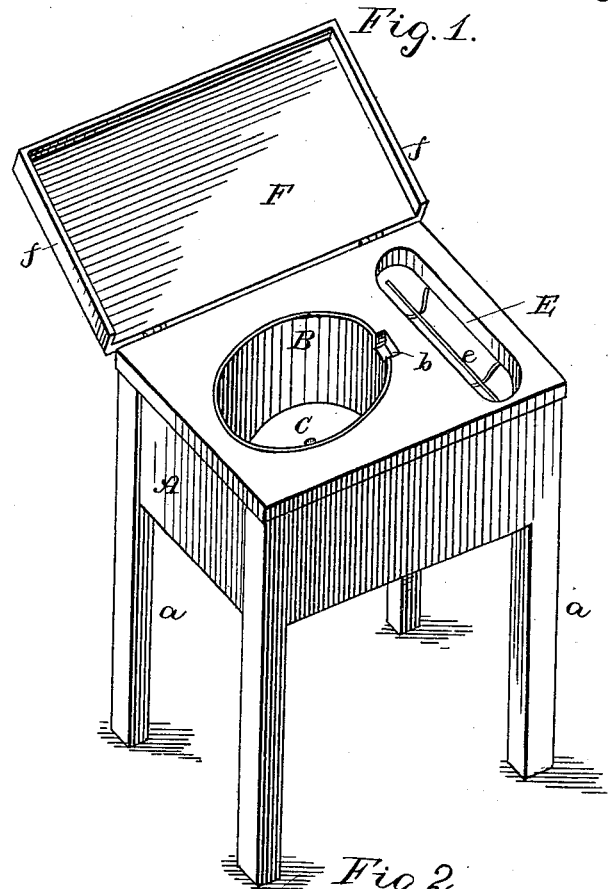
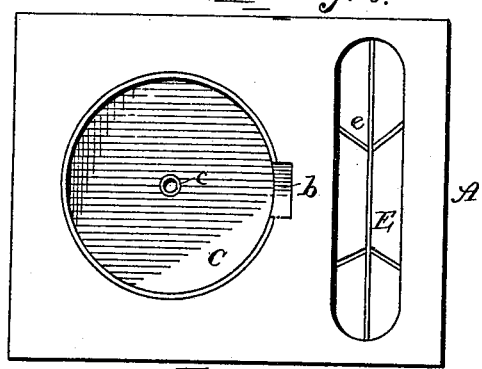
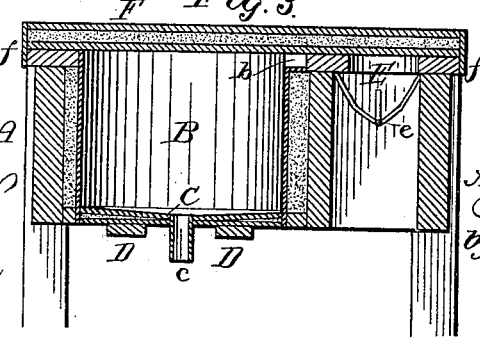
Witnesses:
J. W. Garner
J. R. Littell
Inventor:
T. F. Harrison Jr.
by C. A. Snow & Co.
Attorneys.

UNITED STATES PATENT OFFICE.

THOMAS F. HARRISON, JR., OF BEDFORD COUNTY, TENNESSEE.

WATER-BUCKET STAND.

SPECIFICATION forming part of Letters Patent No. 245,295, dated August 9, 1881.

Application filed May 26, 1881. (No model.)

*To all whom it may concern:*

Be it known that I, THOMAS F. HARRISON, Jr., of the county of Bedford and State of Tennessee, have invented certain new and useful Improvements in Water-Bucket Stands; and I do hereby declare that the following is a full, clear, and exact description of the invention, which will enable others skilled in the art to which it appertains to make and use the same, reference being had to the accompanying drawings, which form a part of this specification.

The object of my invention is to provide a convenient water-bucket stand; and the invention consists in a stand having a circular recess or receptacle for a water-bucket and an opening for a dipper, a hinged lid being provided that covers the bucket and dipper when arranged in their places, as hereinafter more fully described.

In the annexed drawings, which fully illustrate the invention, Figure 1 is a perspective view of the stand with cover raised. Fig. 2 is a plan view of the same with cover removed; and Fig. 3 is a vertical longitudinal section.

Like letters of reference indicate like parts in the several views.

The stand A is supported on suitable legs, *a a*, or may be arranged as an inclosed closet, if desired.

Within the upper part of the stand, at one end, is a circular opening or recess, B, of such diameter and depth as to accommodate an ordinary water-bucket, which rests, when in position, upon a removable bottom, C, that is supported upon the slats D D. This removable bottom C is slightly concaved, and is provided in the center with a drip-tube, *c*. It is also made double and provided with a suitable non-conducting packing.

At the top of the circular recess B, on one side, is a notch or depression, *b*, for the reception of the bucket-handle. The sides of the recess B are formed of metal, or provided with a metallic lining, on the outside of which, within the body of the stand, may be arranged a suitable non-conducting packing, so that the stand will afford assistance in keeping the water in the bucket at a low temperature.

An elongated opening, E, is made in the stand at one end and near the recess B, for the reception of a dipper, which is supported on a wire frame, *e*, that forms the bottom of the opening, and by draining the dipper serves to prevent injury to the stand from the effects of water.

The stand is provided with a hinged lid, F, having a flanged rim, *f*, which fits closely around the edges of the stand when closed and excludes dust and heat, besides protecting the bucket and dipper from domestic animals. This lid is also made double, and may be filled with any suitable non-conducting packing.

By means of this covered stand water contained in an ordinary bucket will be kept cool and free from dust, as well as protected from the access of domestic animals. It is apparent that the stand may be finished so as to form an ornamental as well as a useful article of household furniture.

Having thus fully described my invention, what I claim as new, and desire to secure by Letters Patent, is—

1. A water-bucket stand having a hinged lid and recesses or receptacles for a water-bucket and a dipper, substantially as and for the purpose specified.

2. A water-bucket stand constructed with double walls, and having a receptacle for a water-bucket provided with a double removable bottom, through which a drip-tube is passed, an opening having a wire bottom being arranged for the reception of a dipper, and said openings or recesses for the bucket and dipper being arranged beneath a double-hinged lid, substantially as and for the purpose shown and described.

In testimony that I claim the foregoing as my own I have hereto affixed my signature in presence of two witnesses.

THOMAS FRANKLIN HARRISON, JR.

Witnesses:
ROBERT WAITE CLARK,
EDMUND COOPER, Jr.